(12) United States Patent
Lavalle

(10) Patent No.: US 10,779,684 B2
(45) Date of Patent: Sep. 22, 2020

(54) LINEAR HERB GRINDER

(71) Applicant: Nicolas Elliot Lavalle, Seattle, WA (US)

(72) Inventor: Nicolas Lavalle, Seattle, WA (US)

(73) Assignee: POLYMEROGRAPHY, LLC, Seattle, WA (US)

( * ) Notice: Subject to any disclaimer, the term of this patent is extended or adjusted under 35 U.S.C. 154(b) by 120 days.

(21) Appl. No.: 16/260,156

(22) Filed: Jan. 29, 2019

(65) Prior Publication Data

US 2020/0237157 A1 Jul. 30, 2020

(51) Int. Cl.
*A47J 42/34* (2006.01)
*B26D 1/46* (2006.01)

(52) U.S. Cl.
CPC ............... *A47J 42/34* (2013.01); *B26D 1/46* (2013.01)

(58) Field of Classification Search
USPC ..... 241/273.1, 273.4, 100; 83/856–858, 167, 83/158; 99/510–513
See application file for complete search history.

(56) References Cited

U.S. PATENT DOCUMENTS

| | | | | |
|---|---|---|---|---|
| 11,351 A * | 7/1854 | Bradley | | |
| 588,763 A * | 8/1897 | Adams | | |
| 865,763 A * | 9/1907 | Clark, Jr. | ............... | A47J 43/25 |
| 1,111,356 A * | 9/1914 | Boye | ............... | A47J 43/25 |
| | | | | 241/84.4 |
| 1,922,973 A * | 8/1933 | Mischanski | ............... | A47J 43/25 |
| | | | | 241/273.1 |
| 3,441,070 A * | 4/1969 | Loughlin | ............... | A47J 43/25 |
| | | | | 241/84.4 |
| 4,212,431 A * | 7/1980 | Doyel | ............... | A47J 43/25 |
| | | | | 241/100 |
| 4,928,893 A * | 5/1990 | Prindle | ............... | A47J 43/25 |
| | | | | 241/95 |
| 5,660,341 A * | 8/1997 | Perkins | ............... | A47J 43/255 |
| | | | | 241/169.1 |
| 8,096,218 B2 * | 1/2012 | Klotz | ............... | A47J 43/25 |
| | | | | 83/352 |
| 8,596,192 B2 * | 12/2013 | Hauser | ............... | B26D 3/283 |
| | | | | 99/537 |
| 8,613,402 B2 * | 12/2013 | Lefkovitz | ............... | A47J 19/06 |
| | | | | 241/30 |
| 8,636,237 B2 * | 1/2014 | Scharf | ............... | A47J 43/25 |
| | | | | 241/95 |
| 8,672,249 B2 * | 3/2014 | Scharf | ............... | A47J 43/25 |
| | | | | 241/95 |
| 8,882,010 B2 * | 11/2014 | Scharf | ............... | B02C 19/20 |
| | | | | 241/95 |

(Continued)

*Primary Examiner* — Nina Bhat

(57) ABSTRACT

An herb grinder intended to be driven by the thumb in one hand to shave an herb with a plurality of blades. The grinder is a rectangular body comprised of a thumb piece, upper cover, pressurized plate, sliding body, central chamber, and bottom chamber. The top thumb piece is serrated for improved grip. The upper cover allows for the insertion of the herbs, spices, or other foodstuffs. The pressurized plate performs a tamping operation of the food product into the sliding body forcing a downward bias against the blades. The sliding body travels along linear indentations of the central chamber during operation to allow the blades to shear the food, which is evacuated from the central chamber into the bottom chamber.

7 Claims, 2 Drawing Sheets

(56) References Cited

U.S. PATENT DOCUMENTS

| | | | | |
|---|---|---|---|---|
| 8,893,602 B2* | 11/2014 | Fung | ............... | A47J 43/25 |
| | | | | 83/856 |
| 9,198,541 B2* | 12/2015 | Smith | ............... | A47J 43/25 |
| 9,392,908 B2* | 7/2016 | Edwards | ............ | A47J 42/12 |
| 9,578,991 B2* | 2/2017 | Smith | ............... | A47J 43/25 |
| 10,413,129 B2* | 9/2019 | Brown | ............. | A47J 43/07 |
| 2012/0180612 A1* | 7/2012 | Holcomb | ......... | B26D 5/10 |
| | | | | 83/613 |
| 2012/0267462 A1* | 10/2012 | Waibel | ........... | A47J 43/25 |
| | | | | 241/168 |
| 2016/0193744 A1* | 7/2016 | Patel | ............... | B26D 3/11 |
| | | | | 83/167 |
| 2017/0106551 A1* | 4/2017 | Bernede | ......... | B26D 3/26 |

* cited by examiner

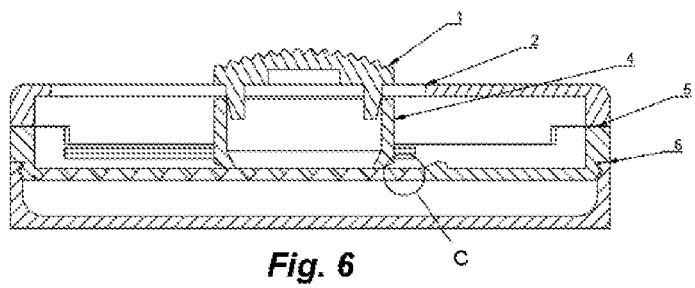
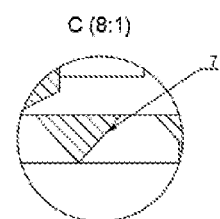
Fig. 6     Fig. 6A
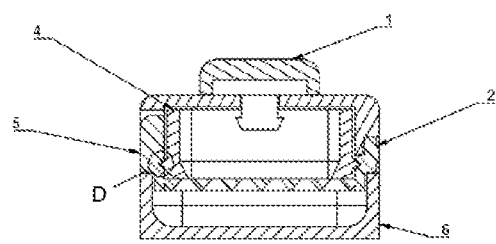
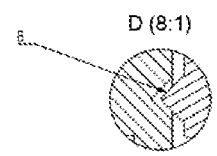
Fig. 7     Fig. 7A
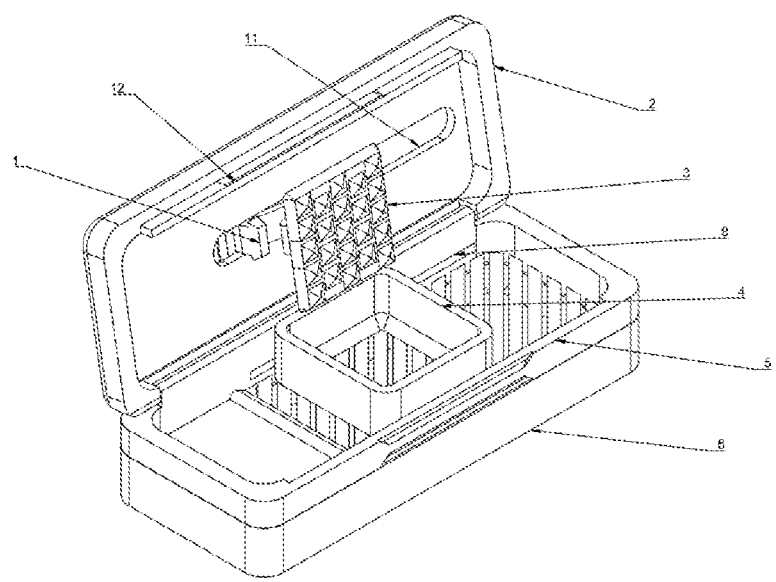
Fig. 8

LINEAR HERB GRINDER

CROSS REFERENCE TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

Field of the Invention

The invention relates to herb grinders. More specifically, the present invention relates to an apparatus to grind herbs easily with one hand.

Description of Related Art

Herb grinders are designed to facilitate processing dried leaves of herbs and spices into a fine powder. The herb grinders currently available can be broken down into electronic and hand-driven categories. Electronic food processors and grinders serve this purpose but can be expensive, large in size, and require an outlet. Hand-driven grinders and shredders are other alternatives for processing dried leaves and herbs, but typically require both hands for use and can result in a limited quality grind. Credit card sized herb grinders exist, however can create a larger mess and present difficulty in extracting the ground herb.

BRIEF SUMMARY OF THE INVENTION

The intent of the linear herb grinder is to perform the food processing function of grinding, but held with one hand, using a sliding motion driven by the thumb. The aim is to provide a small, portable, economic grinder that can still create a satisfactory fineness of ground products. The one-handed design is targeted to users who may experience pain or difficulty using the twisting motion of the cylindrical herb grinders that are available, and the containment of the herb within the slider body provides less mess than the card shaped herb grinders.

BRIEF DESCRIPTION OF THE DRAWINGS

FIG. 6 is a cross section of the side view of the entire grinder in the closed position.

FIG. 6A is a close-up view of the cross section of a single blade from the plurality.

FIG. 7 is a cross section of the front view of the entire grinder in the closed position.

FIG. 7A is a close-up view of the cross section of the protrusion on the sliding body, and the indentations along the central body.

FIG. 8 is a perspective view of the entire assembled grinder in the open position.

DETAILED DESCRIPTION OF THE INVENTION

A hand held herb grinder which is to be operated by the thumb in a one hand operation to shave or grind or comminute hers with a plurality of blades using a linear sliding motion for cutting. The grinder is a rectangular body comprising a housing including three chambers a top chamber, central and bottom chamber, an upper cover, pressurized plate to engage with the blades within the central chamber. The top thumb piece includes serration in the construction for improved grip. The upper cover allows for the insertion of herbs, spices or other foodstuff. The pressurized plate performs a tamping operation on the food produce as it is pressed and comminuted by the sliding body forcing a downward bias against the blades. The sliding body travels along linear indentations within the central chamber during operation to allow the blades to shear the food, which is urged from the central chamber into the bottom chamber after the shaving, grinding or comminuting operation.

Figure 1:
FIG. 1 is a side view of the entire assembled grinder in the closed position.
Figure 2:
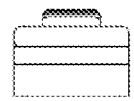
FIG. 2 is a front view of the entire assembled grinder in the closed position.
Figure 3:
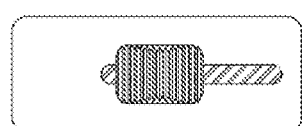
FIG. 3 is a top view of the entire assembled grinder in the closed position.
Figure 4:
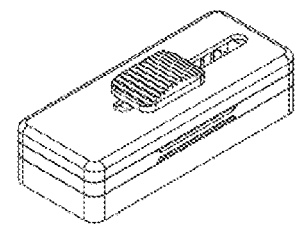
FIG. 4 is a perspective view of the entire assembled grinder in the closed position.

FIGS. 1-4 teach the herb grinder in the closed position shown with different orientations. Specifically, FIG. 1, shows the side view of the herb grinder. FIG. 2, shows the herb grinder front view. FIG. 3, shows the top view of the herb grinder. FIG. 4, is a perspective view of the herb grinder.

Figure 5:
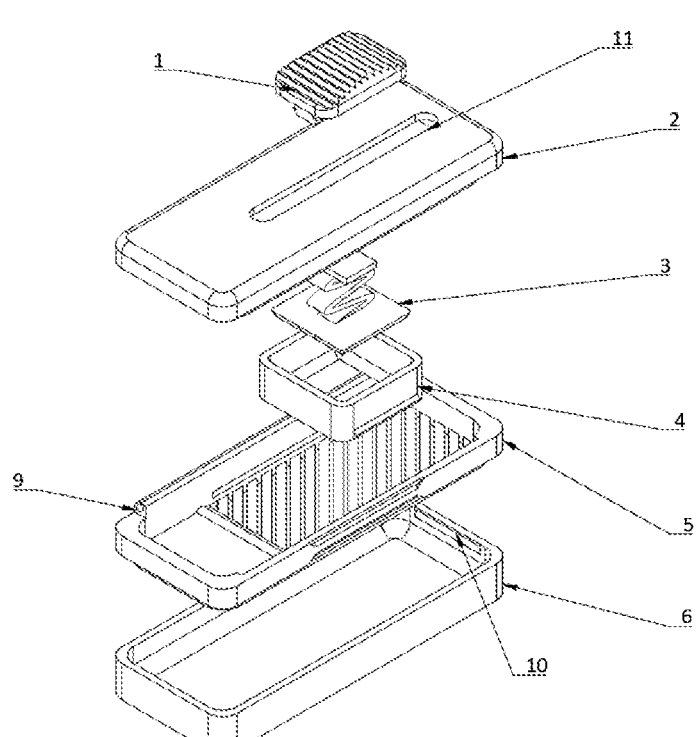
FIG. 5 is an exploded view of the entire grinder in the closed position.

FIG. 5 shows a representation of the grinder according to the invention comprising of a bottom chamber 6, mated with a central chamber 5, wherein a sliding body 4 is able to travel laterally. A pressurized plate 3 creates a bias against the food placed within the sliding body 4. An upper cover 2 is mated with the central chamber 5 along a common axis of pins 9 that allow the upper body to be rotatable. The pressurized plate 3 extends past the opening in the upper cover 11 and connects to the top element 1. The top element 1 is serrated along its top face to improve grip and travels laterally driving the movement of the sliding body 4.

Referring to FIG. 8 there is shown a representation of the grinder according to the invention in the opened state. The upper cover 2 is mated with the central chamber 5 and rotated into an opened position to allow food to be placed in the sliding body 4. The sliding body 4 travels along the central chamber 5 using the linear indentations on the central body 8. The top portion 1 contains annular snap fit protrusions allowing it to mate with the upper cover 2. The top portion 1 and pressurized plate 3 are mated allowing for linear movement through the opening of the upper cover 11. Once food has been placed within the sliding body 4, rotating the upper cover 2 to close the grinder causes the pressurized plate 3 to create a downward force creating a bias against the blades within the central chamber 5. With this downward bias, driving the linear movement of the connected top portion 1, pressurized plate 3, and sliding body 4 along the linear indentations 8 creates the shearing force that causes the food to grind along the blades of the central chamber 5. The ground food evacuates from the central chamber through openings between the blades into the bottom chamber 6. The bottom chamber 6 may be fitted with a mesh screen to filter out ground food to a specific fineness.

The upper cover 2 contains an indentation 12 allowing for a cantilever snap fit connection to the central chamber 5 once closed. The purpose of this snap fit connection is to prevent the upper cover 2 from opening during operation.

Referring to FIG. 6 and FIG. 6A there is shown a cross-section of the side view of the grinder. The blades 7 highlighted in FIG. 6A contain an angled edge to improve the shearing ability of the blade. The plurality of blades 7 is evenly spaced within the central chamber 5 to control the fineness of food grinding during operation. As the sliding body 4 travels along the central chamber 5 the food is sheared between the bottom of the sliding body 4 and the plurality of blades 7. The space between the blades allows ground food to evacuate into the bottom chamber 6.

Referring to FIG. 7 and FIG. 7A there is shown a cross-section of the front view of the grinder to give closer detail to the linear indentations 8 along the central chamber 5. The sliding body 4 contains an offset protrusion matching the linear indentation 8, allowing it to travel laterally while preventing upward or downward movement.

The invention has been explained with reference to specific embodiments. Other embodiments will be apparent to those of ordinary skill in the art. Therefore it is not intended that the invention be limited, except as indicated by the appended claims.

I claim:

1. An herb grinder with a rectangular cross section comprising:
    a housing comprising a top, central and bottom chamber, wherein said top chamber includes an upper cover with an opening for placement of herbs, the upper cover connected to a central chamber and further includes a top portion positioned above and upper cover, the top portion connected to a pressure plate;
    a bottom chamber, the bottom chamber for collection of ground herbs;
    a central chamber constructed and arranged with a plurality of blades and apertures, said central chamber connected to said bottom chamber wherein the ground herbs exit into said bottom chamber;
    a sliding body including a hollow box with open top and bottom faces constructed and arranged to be disposed with said central chamber wherein the width of the sliding body is smaller in width than central chamber wherein the sliding body contain the herbs for grinding wherein the sliding body is position inside of said central chamber; and
    a pressure plate position within said sliding body with a bias against the blades disposed within said central chamber.

2. The herb grinder of claim 1 wherein said central chamber contains linear indentations along the long side of the rectangular shape.

3. The herb grinder of claim 1 wherein said sliding body contains outward protrusions matching the linear indentations of said central chamber.

4. The herb grinder of claim 1 wherein said herb grinder is sized to be held in one hand.

5. The herb grinder of claim 1 wherein said top portion is driven by the thumb.

6. The herb grinder of claim 1 wherein said upper member consists of a slot opening along the length of the rectangular shape.

7. The herb grinder of claim 6 wherein said pressured plate is connected through said slot of the top portion with a spring-mechanism.

* * * * *